Patented Jan. 23, 1923.

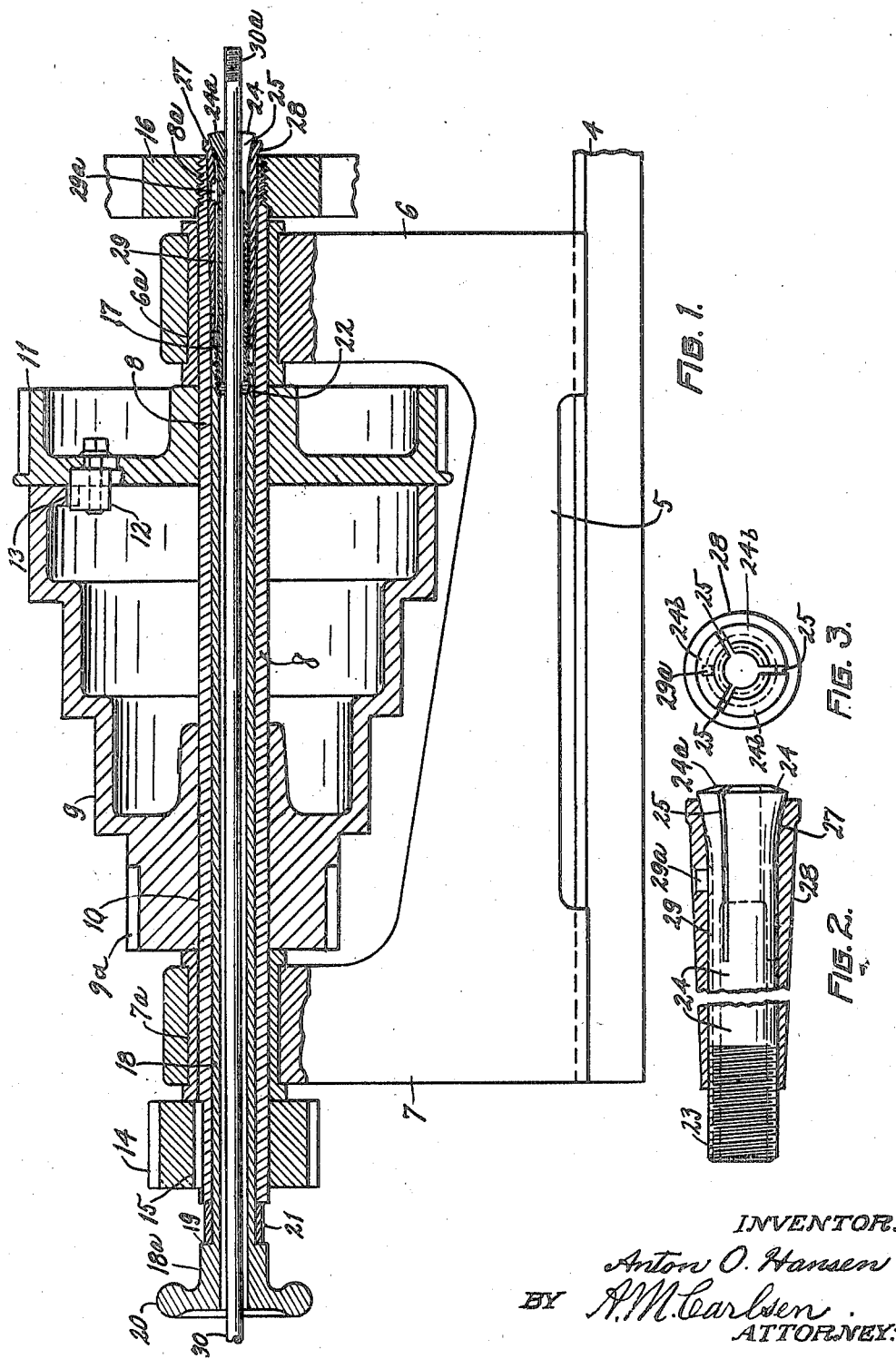

1,443,127

UNITED STATES PATENT OFFICE.

ANTON O. HANSEN, OF ST. PAUL, MINNESOTA.

LATHE ATTACHMENT.

Application filed December 13, 1921. Serial No. 522,417.

*To all whom it may concern:*

Be it known that I, ANTON O. HANSEN, a citizen of the United States, residing at St. Paul, in the county of Ramsey and State of Minnesota, have invented a new and useful Lathe Attachment, of which the following is a specification.

My invention relates to attachments for lathes and the object is to provide a simple, compact and efficient device operated by and in connection with the head stock spindle for the purpose of holding light bar stock on which threads are to be cut or other work done.

In the accompanying drawing:

Fig. 1 is a partly sectional side elevation of the head stock portion of a lathe and lathe bed, the spindle, with my device installed therein, and adjacent parts being shown in section.

Fig. 2 is an enlarged detail side elevation of the clamping member of my device and the sleeve 27 in section.

Fig. 3 is a right hand end elevation of Fig. 2.

Referring to the drawing by reference numerals, 4 represents the bed of a lathe to which is secured the head stock 5, usually a large casting with two vertically arranged posts 6, 7 having bearings 6ª, 7ª, respectively, in which the hollow head stock spindle 8 rotates. A belt cone 9, having an integral pinion 9ª at its small end, is journaled at 10 on the spindle; the large end of the cone abutting a bull gear 11 and detachably engaged with same by a slidable catch 12 engaging a notch 13 in the adjacent part of the cone. The usual speed changing gears driven by a pinion 9ª and driving the bull gear 11 being well known are not shown, also the gears driven by a pinion 14 keyed at 15 and the feed screw of the lathe driven thereby are omitted.

The front end of the spindle projects beyond the bearing 6ª and is provided with male threads 8ª for a chuck, face plate or other carrier 16 and its bore is tapered from the outer end approximately to point 17, from which point the bore is straight to the rear end of the spindle.

Slidable in the spindle 8 is a tubular bar 18 of a size to slide snugly in the bore of the lathe spindle 8; the rear end of said bar 18 has an enlarged portion 18ª forming a shoulder 19 and a hand wheel 20 rearward thereof, all formed integral. A spacer collar 21 is normally interposed between the shoulder 19 and the rear end of the lathe spindle 8, the length of the tube 18 is such that when said spacer 21 is used the inner end of the tube does not quite reach the taper bore of the spindle 8. The inner end of tube 18 is provided with female threads 22 adapted to engage the male threads 23 of a clamping member 24; said clamping member 24 is long enough to protrude from the front end of the spindle 8, its outer end 24ª being flared out (see Figs. 1 and 2) and having a number of radial slits 25 forming it into jaws 24ᵇ. The flared end 24ª fits into a corresponding flared portion 27 in the outer end of an externally tapered sleeve 28 adapted to fit and be held by friction in the tapered bore of the lathe spindle and the balance of the bore of said sleeve 28 is adapted to receive the straight shank of the member 24. The latter member is provided with a longitudinal key way 29 adapted to be engaged by a key 29ª secured in the tapered sleeve 28, thus insuring proper assembling of the two parts. 30 is a piece of bar stock on which work is to be done such as cutting threads 30ª, making screws, etc.

The device is assembled and used as follows:

First, the tapered sleeve 28 is driven lightly into frictional contact with the tapered bore of the lathe spindle 8, then the member 24 is slipped into the bore of said sleeve, with the key 29ª engaging the key seat 29 until the tapered bore of sleeve 28 and flared portion 24ª of member 24 come in contact, at which time the threaded portion protrudes from the inner end of the sleeve 28. Then the spindle 18, with the loose collar 21 adjacent its shoulder 19, is slid into the bore of the spindle 8, far enough so that by turning the hand wheel 20 the threads of the tube 18 will engage the male threads 23 of member 24 and pull the jaws 24ª into the hollow cone 27 thereby closing the jaws tightly about the rod 30. The bar 30 is thus held rigid for whatever operation required and when said operation is completed, the hand wheel 20 is merely given a reverse turn to release the jaws, the bar 30 removed or moved forward preparatory to the next operation and the process repeated.

In removing my device from the lathe the hand wheel is turned until its threads are disengaged from the clamping member 24 which may then be pulled out of sleeve 28. The sleeve 28 is then dislodged and removed by a ramming push with the tube 18 after its collar 21 has been removed to allow the tube to reach the inner end of the sleeve.

It will be readily seen that my device is particularly useful in shops where there are lathes but no machines for handling small bar stock in the manner I have indicated. The tapered sleeve 28 is in each case of the same size as the steel center used in the lathe head stock for other work and therefore there are no changes required in the lathe spindle when my device is to be used. Nor is it necessary to provide a special lathe having a hollow spindle made to fit about the jaws 24ª of the jaw carrying sleeve 24. This latter feature I consider the main one about my invention.

What I claim is:

The combination with the head stock of a lathe of a hollow spindle having its front end formed with an internal cone, an externally conic sleeve fitting tightly in said cone and having a central cylindrical bore flared in the front end, a tubular member slidable in said sleeve and having its front end portion slit longitudinally into resilient arms enlarged at their front ends to fit the flared portion of the sleeve and form clamping jaws, means to prevent rotation of said jaw carrying member in the sleeve, a tube screw threaded upon the rear end of said member and extending rearwardly through the hollow spindle and having its rear end provided with a hand wheel and a shoulder facing the rear end of the spindle so as to pull at the jaw carrying member, and a removable collar upon the tube between the said shoulder and the rear end of the spindle holding the jaws and their pulling tube in normal working position until said collar be removed from the tube, when the latter may be used for pushing out the externally conic sleeve and the jaws therein.

In testimony whereof I affix my signature.

ANTON O. HANSEN.